(12) United States Patent
Kumar

(10) Patent No.: US 7,763,134 B1
(45) Date of Patent: Jul. 27, 2010

(54) FACER FOR INSULATION BOARDS AND OTHER CONSTRUCTION BOARDS

(75) Inventor: Ajay Kumar, Wayne, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 126 days.

(21) Appl. No.: 11/523,444

(22) Filed: Sep. 19, 2006

Related U.S. Application Data

(60) Provisional application No. 60/718,387, filed on Sep. 19, 2005.

(51) Int. Cl.
| | | |
|---|---|---|
| *B29C 65/00* | (2006.01) | |
| *B32B 13/00* | (2006.01) | |
| *B32B 37/00* | (2006.01) | |
| *B32B 7/12* | (2006.01) | |
| *B32B 27/00* | (2006.01) | |

(52) U.S. Cl. .................. 156/39; 428/317.1; 428/319.3
(58) Field of Classification Search ................ 156/39; 428/317.1, 319.3
See application file for complete search history.

(56) References Cited

U.S. PATENT DOCUMENTS

| | | | | |
|---|---|---|---|---|
| 4,351,873 | A | 9/1982 | Davis .................. | 428/198 |
| 4,378,272 | A | 3/1983 | Suwala et al. ........ | 162/152 |
| 4,615,822 | A | 10/1986 | Magnus ............... | 252/182 |
| 4,720,317 | A * | 1/1988 | Kuroda et al. ........ | 156/250 |
| 5,312,848 | A | 5/1994 | Klapper et al. ....... | 521/172 |
| 5,717,012 | A | 2/1998 | Bondoc et al. ........ | 524/13 |
| 5,736,591 | A | 4/1998 | Dunn .................. | 523/122 |
| 5,772,846 | A | 6/1998 | Jaffee ................. | 162/145 |
| 5,776,841 | A | 7/1998 | Bondoc et al. ........ | 442/320 |
| 5,837,352 | A * | 11/1998 | English et al. ........ | 428/198 |
| 5,843,056 | A * | 12/1998 | Good et al. ........... | 604/367 |
| 5,965,257 | A | 10/1999 | Ahluwalia ............ | 428/357 |
| 6,096,416 | A | 8/2000 | Altenberg ............ | 428/317.7 |
| 6,291,552 | B1 | 9/2001 | Dong .................. | 523/217 |
| 6,316,085 | B1 | 11/2001 | Heine ................. | 428/220 |
| 6,365,533 | B1 | 4/2002 | Horner, Jr. et al. .... | 442/374 |
| 6,368,991 | B1 | 4/2002 | Horner, Jr. et al. .... | 442/374 |
| 6,746,781 | B2 * | 6/2004 | Francis et al. ........ | 428/537.5 |
| 6,774,071 | B2 | 8/2004 | Horner, Jr. et al. .... | 442/374 |
| 6,794,017 | B2 | 9/2004 | Comeau et al. ........ | 428/182 |
| 6,838,163 | B2 | 1/2005 | Smith et al. .......... | 428/294.7 |

(Continued)

*Primary Examiner*—Philip C Tucker
*Assistant Examiner*—Michael N Orlando
(74) *Attorney, Agent, or Firm*—William J. Davis; Alvin T. Rockhill

(57) ABSTRACT

The subject invention relates to a facer which is comprised of a breathable film and a glass-mat, wherein the breathable film and the glass mat are bonded together with an adhesive, wherein the breathable film is comprised of a breathable polymeric material selected from the group consisting of polyolefins, nylons, polyesters, and thermoplastic elastomers, and wherein the facer is water resistant. The facers of this invention can be employed in manufacturing construction board, such as polyisocyanurate boards, polystyrene boards, or gypsum boards. The present invention accordingly more specifically discloses a construction board which is comprised of a rigid sheet and a facer, wherein the facer is bonded to at least one side of said rigid sheet, wherein the rigid sheet is comprised of a member selected from the group consisting of gypsum, blown polystyrene, and polyisocyanurate, wherein the facer is comprised of a breathable polymeric material selected from the group consisting of polyolefins, nylons, polyesters, and thermoplastic elastomers, wherein the breathable polymeric material is bonded to another substrate, such as a glass-mat with an adhesive, and wherein the facer is water resistant.

19 Claims, 4 Drawing Sheets

U.S. PATENT DOCUMENTS

| | | |
|---|---|---|
| 6,866,923 B2 | 3/2005 | Thornsberry et al. ..... 428/304.4 |
| 6,913,816 B2 | 7/2005 | Longcor, IV et al. ..... 428/316.6 |
| 2002/0155282 A1* | 10/2002 | Randall et al. .............. 428/341 |
| 2003/0088003 A1* | 5/2003 | Corzani et al. .............. 524/270 |

* cited by examiner

FACER FOR INSULATION BOARDS AND OTHER CONSTRUCTION BOARDS

This application claims the benefit of U.S. Provisional Patent Application Ser. No. 60/718,387, filed on Sep. 19, 2005.

FIELD OF INVENTION

This invention relates facers for utilization in manufacturing construction boards. These facers are comprised of a breathable film and a glass mat-substrate, wherein the breathable film and the glass-mat substrate are bonded together with an adhesive. This invention further relates to construction boards, such as gypsum boards, polyisocyanurate boards, or polystyrene boards, by utilizing the facer of this invention.

BACKGROUND OF THE INVENTION

Wallboard formed of a rigid core sandwiched between facing layers is well known in building construction. It is used as a surface, both exterior and interior, for walls and ceilings, roofs and siding, as tile backer and in many other applications. Historically, cellulosic (paper-based) facers have been common but more recently fiberglass facers have been used for their superior dimensional stability, resistance to water, weatherability, resistance to mold and other advantages.

Polyisocyanurate boards, gypsum boards, and polystyrene boards are widely used in the construction of interior walls in homes and office buildings. Such construction boards have come into widespread use because they are a low cost alternative to other products and offer a unique combination of benefits. For instance, construction boards are easy to handle and can be cut to cover the shape of virtually any interior wall surface while requiring minimal labor. Additionally, wall boards of this type are light weight, making it easy for professional construction workers and homeowners to use them. Gypsum wall board also offers a high level of fire resistance and sound barrier characteristics. Construction boards can also be painted and will readily accept wallpaper. Additionally, gypsum wall board exhibits a very low level of expansion and contraction with changing temperature and/or humidity levels. Accordingly, gypsum wall board is highly resistant to cracking.

Gypsum is actually hydrous calcium sulfate ($CaSO_4.2H_2O$) which is also known as karstenite, muriacite, anhydrous sulfate of lime, and anhydrous gypsum. In making gypsum board, wet gypsum is generally formed into a sheet between two paper layers known as facers. The paper facers accordingly form the outer surfaces of the gypsum board sheets. These sheets normally have a thickness of about 0.5 inch or 5/8 inch and are four feet in width and eight feet or twelve feet in length. High impact strength gypsum wall board is made by imbedding a layer of fiberglass mesh in the gypsum. Wall boards can also be manufactured utilizing polystyrene or polyisocyanurate in lieu of gypsum in making the rigid sheet of the wallboard. The facers of this invention can also be used in making polyisocyanurate boards, polyurethane boards, and polystyrene boards for roofing insulation. These materials offer the advantages of high water resistance, ultraviolet light resistance and fungal resistance.

Paper facers have low water resistance and weatherability and are also not dimensionally stable. Also, paper facers can be destroyed by bacterial and/or fungal growth. Thus, paper facers are not totally satisfactory in applications where they may be exposed to water or high levels of humidity.

Gypsum wallboards, polyisocyanurate wallboards (isoboards), and polystyrene wallboards all offer an array of advantages in various applications. However, their utility and service life can be compromised by the traditional problems associated with paper facers. For instance, paper facers do not provide a satisfactory barrier to liquid water and are susceptible to bacterial and fungal growth.

SUMMARY OF THE INVENTION

The construction boards of the present invention include polymeric facers that exhibit water barrier characteristics and an excellent combination of physical attributes including high tensile strength, tear strength, burst strength, puncture resistance, and stiffness. Additionally, the polymeric facers of this invention are breathable and can be used in manufacturing insulation board and other construction boards. Accordingly, the breathable facers of this invention offer a combination of beneficial characteristics that cannot be obtained with paper facers and can be manufactured without encountering significant problems.

The present invention relates to facers for gypsum boards used in building construction and to gypsum boards made from them. More specifically, it relates to facers composed of "breathable films" attached to fibrous mats. However, these breathable films provide a barrier to the flow of liquid water. They accordingly provide insulation board and other construction boards of the invention with a degree of water resistance. They also provide the construction boards of this invention with an outstanding combination of physical attributes.

In one embodiment of this invention the polymeric facer is applied to both sides of the rigid core, such as gypsum, utilized in the construction board. In another embodiment of this invention, the polymeric facer is applied to only one side of the construction board with another type of facer, such as a paper facer, being applied to the other side of the construction board. In the alternative a breathable polymeric facer can be applied to one side of the construction board with a non-breathable film being applied to the other side of the construction board as its facer. In such a scenario, the breathable polymeric film utilized as the facer of the construction board allows for water to escape from the interior area of the construction board (the gypsum) during the manufacture thereof.

The present invention more specifically discloses facer which is comprised of a breathable film and a glass-mat, wherein the breathable film and the glass mat are bonded together with an adhesive, wherein the breathable film is comprised of a breathable polymeric material selected from the group consisting of polyolefins, nylons, polyesters, and thermoplastic elastomers, and wherein the facer is water resistant. These facers can be used as shingle or tile underlayment for roofs. The polymeric film can be applied on both sides of the glass-mat by using adhesives and may be used as an underlayment. The facers of this invention can be developed by applying the polymeric film on paper. This can also be used as an underlayment. The paper employed can be of virtually any type, such as kraft paper or fiber glass reinforced paper. The facers of this invention can also be developed by applying polymeric films on an asphalt coated or saturated paper. This can also be used as an underlayment.

The subject invention also reveals a construction board which is comprised of a rigid sheet and a facer, wherein the facer is bonded to at least one side of said rigid sheet, wherein the rigid sheet is comprised of a member selected from the group consisting of gypsum, blown polystyrene, and polyisocyanurate, wherein the facer is comprised of a breathable polymeric material selected from the group consisting of polyolefins, nylons, polyesters, and thermoplastic elastomers, and wherein the facer is water resistant.

The present invention further discloses a process of manufacturing a construction board which comprises (1) positioning a wet gypsum composition between a first facer and a second facer to make a laminated sheet of wet construction board, wherein the first facer is comprised of a breathable film and a glass mat, wherein the breathable film and the glass-mat are bonded together with an adhesive, wherein the breathable polymeric material is selected from the group consisting of polyolefins, nylons, polyesters, and thermoplastic elastomers and wherein the polymeric material is water resistant, and (2) heating the laminated sheet of wet construction board to an elevated temperature for a period of time which is sufficient to reduce the moisture content of the gypsum to a level of about 21 percent.

DETAILED DESCRIPTION OF THE INVENTION

Figure 1:
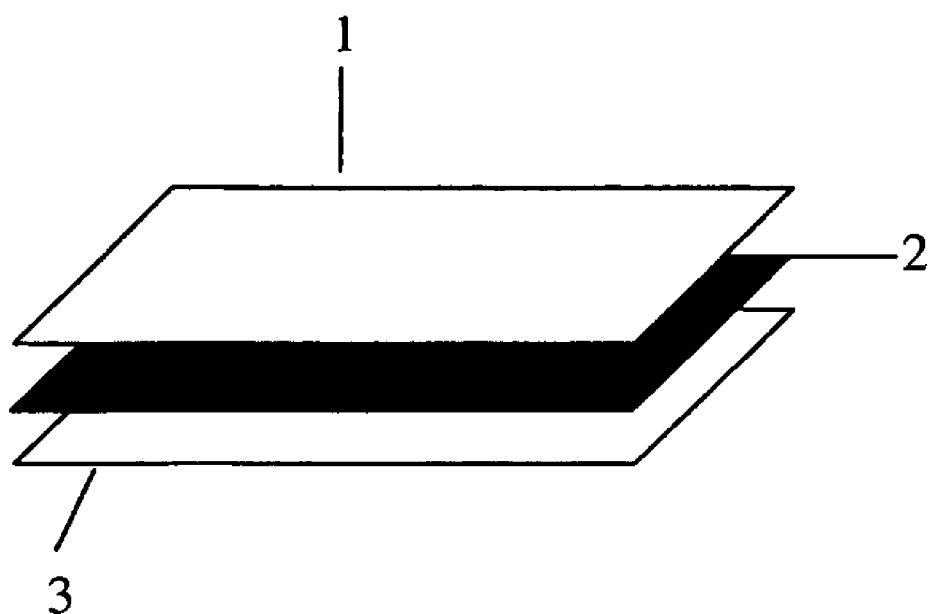
FIG. 1 is an exploded side view of a facer having adhesive covering the entire surface of the breathable film.

The facer of this invention is depicted in FIG. 1. Such a facer is comprised of the breathable film 1 which is bonded to a glass-mat 2 or other suitable substrate with an appropriate adhesive 3. Such facers can be utilized in manufacturing construction boards, such as polyisocyanurate boards or polystyrene boards.

The insulation boards, for which the present facer is particularly suited, comprise conventional thermosetting or thermoplastic foam cores, such as foamed polyurethane or polyurethane modified polyisocyanurate or phenol-formaldehyde cores disposed between a pair of facer members which are laminated to the core surfaces. Other non-elastomeric foamable chemicals, such as polyvinyl chloride, polystyrene, polyethylene, polypropylene, and others conventionally employed as core material can also be employed as the insulation board core of this invention. Rigid foamed cores of this type are described for example in U.S. Pat. No. 4,351,873. The teachings of U.S. Pat. No. 4,351,873 are hereby incorporated by reference in their entirety.

The present facers are also suitable for sheathing a siding underlayment generally of a thickness up to about 1 inch and composed of a non-elastic core material of a chemical or chemical mixture similar to that of the insulation core. The use of instant facer eliminates the need for expensive foil facings which hold and reflect heat and often cause warping and deterioration of wood overlayment. Also, foil and similar facings are easily punctured which gives rise to moisture attack.

Figure 3:
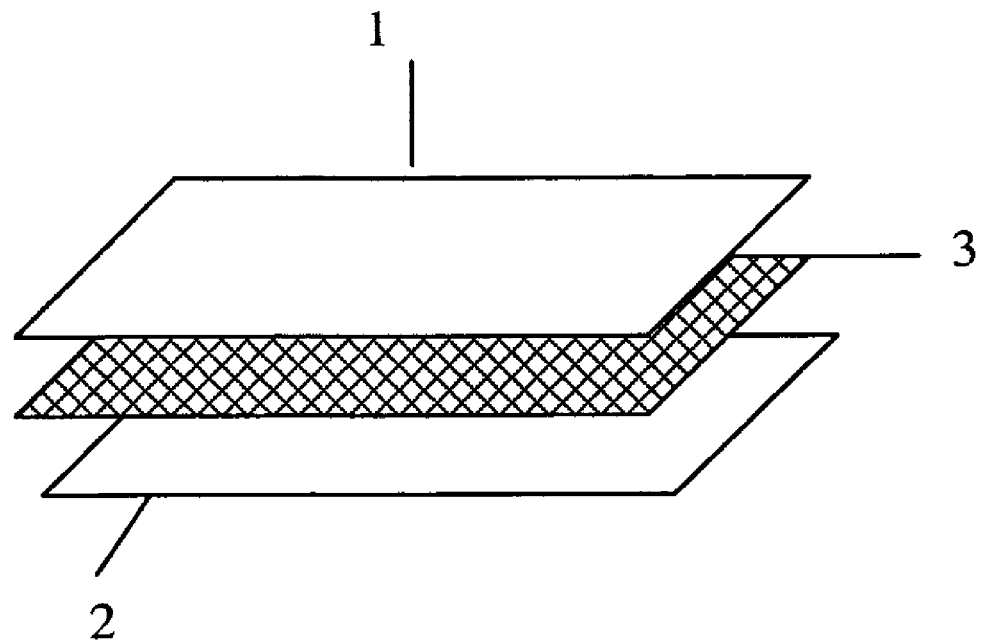
FIG. 3 is an exploded side view of a facer having adhesive covering only a portion of the surface area of the breathable film.

The construction boards of this invention utilize a conventional core of polyisocyanurate, gypsum, or polystyrene in conjunction with a facer which is a breathable film or membrane of a polymeric material that provides water barrier characteristics. Such a facer is depicted in FIGS. 1 and 3 wherein a breathable film 1 is bonded to a glass-mat 2 with an adhesive. For purposes of this invention, breathable films are films that allow gases, such as water vapor, to pass through them but do not allow liquids, such as water, to pass through. This property is often measured as "moisture vapor transmission rate" or MVTR (for example see ASTM Test Method E96). Two of the more common methods of accomplishing breathability in films include (1) monolithic film technology and (2) microporous film technology. Both methods have advantages and disadvantages, but both these and other less common methods of rendering films breathable can be utilized in the practice of this invention.

The breathable film component of the facers utilized in the practice of this invention can be, but are not limited to, microporous membranes. Such microporous membranes can be manufactured by stretching a polymeric blend of two incompatible polymers. In the alternative, suitable microporous films can be made by stretching polymeric films that are filled with inorganic particles, such as calcium carbonate particles. For instance, suitable microporous films can be made by stretching polyolefin, polyester, or nylon films that are filled with inorganic particles. In another alternative, the breathable film can be made by mechanically punching or drilling tiny holes into the polymeric film. Polyolefins that can be used in manufacturing such films include polyethylene, and polypropylene. Polypropylene films are typically utilized in such applications. To attain desired physical properties, the film will typically be biaxially oriented by stretching in multiple directions.

In another embodiment of this invention the breathable film utilized as the facer can be a monolithic membrane. Such membranes can be dense polymeric films that are produced by simply casting or extruding the polymer into a solid film which is free of void space and pinholes. Such monolithic films allow the transmission of vapors by active diffusion. Vapors can dissolve into the monolithic film, diffuse through it, and then evaporate into the atmosphere on the other side of the film. However, liquids cannot flow through such monolithic films making them a barrier to liquids such as water. Examples of monolithic membrane breathable films include, but are not limited to, thermoplastic elastomers or thermoplastic polyurethanes.

The polymeric material utilized in making the facer can contain a wide variety of conventional additives. For instance, the polymeric material can include processing aids, antidegradants (antioxidants and/or antiozonants), ultra violet light stabilizers, heat stabilizers, biocides, antifungal agents, viscosity modifiers, reinforcing additives, strength enhancers, colorants, pigments, and the like. For instance, colorants or pigments are commonly added to provide the facer with a desired color characteristic. Any conventional anti-skid composition having a standard chemical composition can also be applied on the top of the film to avoid slippage, if required, at the time of manufacturing the film or thereafter.

Figure 4:
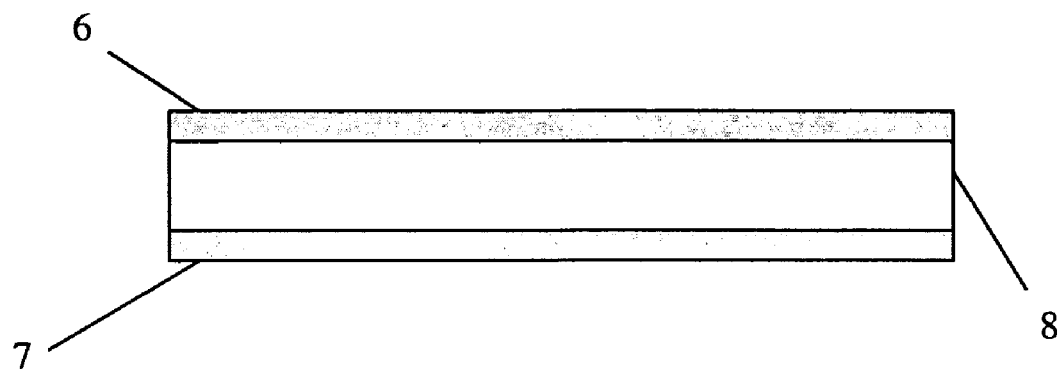
FIG. 4 is a cross sectional view of a construction board of this invention.

The construction boards of this invention are manufactured utilizing standard techniques and conventional equipment except for the fact that a polymeric facer made with a microporous film or a monolithic film is utilized in lieu of conventional paper facers used in prior art techniques. Such a construction board having a first facer 6, a second facer 7, and a rigid core 8 is depicted in FIG. 4. The facers of this invention are comprised of a breathable film and a glass mat, wherein the breathable film and the glass-mat are bonded together with an adhesive, wherein the breathable polymeric material is selected from the group consisting of polyolefins, nylons, polyesters, and thermoplastic elastomers and wherein the polymeric material is water resistant. In such manufacturing techniques, a core of wet gypsum, blown polystyrene, or polyisocyanurate is laminated between two films of the facer material being utilized. To enhance the strength of the construction board a fiberglass mesh can optionally be imbedded into the core of the construction board. The polymeric film utilized in manufacturing the facer will typically be 0.5 mils to 5 mils thick. The breathable film employed in the facer will more typically have a thickness which is within the range of 0.8 mils to 2 mils and will preferably have a thickness of 0.9 mils to 1.2 mils.

The facer is typically bonded to the core of the construction board utilizing a suitable adhesive. The adhesive can be a breathable adhesive that readily allows water vapor to be transmitted therethrough or the adhesive can be a non-breathable adhesive. Normally, the application of any adhesive reduces breathability. However, the breathability of the facer will still typically be adequate by virtue of the fact that the polymeric film is breathable and the glass-mat is porous.

Figure 2:
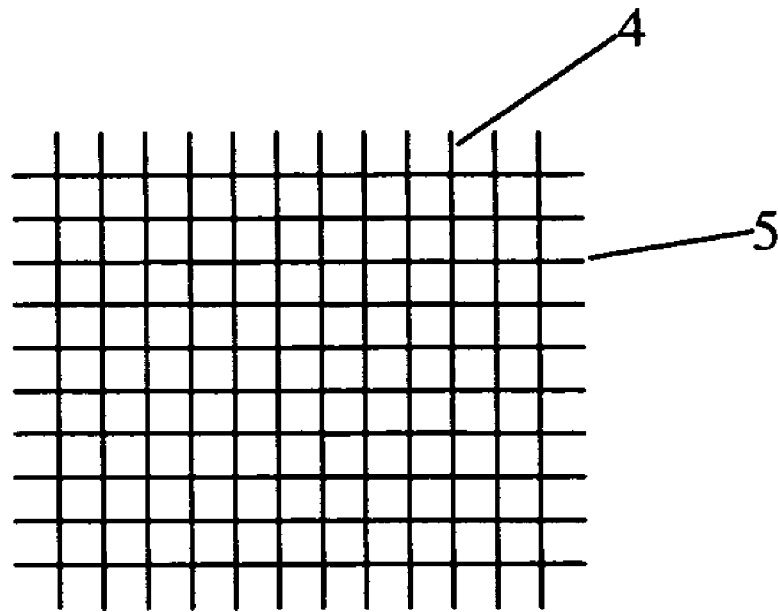
FIG. 2 is a schematic drawing depicting a pattern for applying an adhesive to only a portion of the surface area of the breathable film.

The adhesive can be applied on the glass-mat first and the film can be subsequently be attached to it. Since glass-mat is very uneven, application of a continuous adhesive may not close the pores of the glass-mat completely. In such cases, on attachment of the film to the glass-mat there may be small holes with no adhesive. This can lead to a facer having good breathability. Such a facer that has an adhesive 3 which is applied to the entire surface area of the breathable film 1 is depicted in FIG. 1. However, in cases where non-breathable adhesives are utilized, only a portion of the surface area between the facer and the core of the construction board should be covered with adhesive. A pattern for application of adhesive to only a portion of the interface between the film and the glass-mat is depicted in FIG. 2. In this pattern the adhesive is applied in a series of vertical lines 4 and a series of horizontal lines 5 that are perpendicular to each other. A facer made by applying the adhesive in this pattern is depicted in FIG. 3. The adhesive can be applied in any fashion, such a pattern of beads, spirals or lines. In such cases, a sufficient surface area must be covered with adhesive to strongly bond the facer to the core of the construction board. However, the surface area covered with adhesive should not be so great as to destroy the breathability of the facer by making the construction board unmanufacturable in conventional equipment by virtue of inhibiting the transmission of water vapor therethrough.

A wide variety of adhesives can be utilized in the facers and construction boards of this invention. For instance, the adhesive used can be (1) a water based adhesive, such as a vegetable glue, a EVA or PVA resin, a protein glue (casein), or a latex cement, (2) a thermal adhesive, such as a hot melt adhesive or wax, (3) a multi-component adhesive made by mixing two or more components that can chemically react to form a chemical crosslink, such as an epoxy, polyurethane, silicone or acrylic, and (4) an ultraviolet or electron beam cure adhesive, such as a adhesive that contains a monomer and/or oligomer that can crosslink on exposure to ultraviolet light, including silicons, urethane/acrylic blends and cyanoacrylates.

In cases where it is difficult to work with polymeric films due to the high heat required in drying the water based or other types adhesive, it is frequently possible to work with such films by using ultraviolet or electron beam curable adhesives to develop the facer. The adhesive in this case also can be applied in any of the pattern previously described to cover only a portion of the surface area of the polymeric film. Additionally, the adhesive can be filled with an inorganic or organic filler to reduce the overall cost of the final product.

Construction boards can be manufactured with the facers of this invention using conventional techniques and standard equipment. Applicable techniques for manufacturing polyisocyanurate boards are disclosed in U.S. Pat. No. 6,365,533, U.S. Pat. No. 6,368,991, and U.S. Pat. No. 6,774,071. The teachings of U.S. Pat. No. 6,365,533, U.S. Pat. No. 6,368,991, and U.S. Pat. No. 6,774,071 are incorporated by reference herein in their entirety.

The laminated material is then heated at an elevated temperature to drive excess water from the core material utilized in making the rigid sheet (core) of the facer. In manufacturing gypsum wallboards, the laminated sheet of wet construction board is typically heated to a temperature which is within the range of about 200° F. to about 700° F. for period of about 5 minutes to about 120 minutes. The laminated sheet of wet construction board will more typically be heated to a temperature which is within the range of about 400° F. to about 600° F. for a period of about 30 minutes to about 60 minutes. In any case, the moisture content of the gypsum will be reduced from a level of about 50% to a level which is within the range of about 18% to about 25%. The moisture content of the gypsum will typically be reduced to a level of about 21%. The general procedure of manufacturing gypsum boards described in U.S. Pat. No. 6,770,354 can be implemented in the practice of this invention. The teachings of U.S. Pat. No. 6,770,354 are incorporated herein by reference in their entirety.

This invention is illustrated by certain examples that are merely for the purpose of illustration and are not to be regarded as limiting the scope of the invention or the manner in which it can be practiced. Unless specifically indicated otherwise, parts and percentages are given by weight.

While certain representative embodiments and details have been shown for the purpose of illustrating the subject invention, it will be apparent to those skilled in this art that various changes and modifications can be made therein without departing from the scope of the subject invention.

What is claimed is:

1. A process of manufacturing a construction board which comprises (1) positioning a wet gypsum composition between a first facer and a second facer to make a laminated sheet of wet construction board, wherein the first facer is comprised of a breathable film and a glass-mat, wherein the breathable film and the glass mat are bonded together with an adhesive, wherein the breathable film is comprised of a breathable polymeric material selected from the group consisting of nylons and thermoplastic elastomers, wherein the breathable film has a thickness which is within the range of 0.9 mils to 1.2 mils, wherein the breathable film is a microporous membrane, and wherein the polymeric material is water resistant, and (2) heating the laminated sheet of wet construction board to an elevated temperature for a period of time which is sufficient to reduce the moisture content of the gypsum to be within the range of 18 to 25 percent.

2. A process of manufacturing a construction board as specified in claim 1 wherein wet gypsum composition has a moisture content which is within the range of about 40 percent to about 60 percent.

3. A process of manufacturing a construction board as specified claim 1 wherein the laminated sheet of wet construction board is heated to a temperature which is within the range of 200° F. to 700° F.

4. A process of manufacturing a construction board as specified in claim 1 wherein the breathable film is a monolithic membrane.

5. A process of manufacturing a construction board as specified in claim 4 wherein the monolithic membrane is comprised of a thermoplastic elastomer.

6. A process of manufacturing a construction board as specified in claim 4 wherein the monolithic membrane is comprised of a thermoplastic polyurethane.

7. A process of manufacturing a construction board as specified in claim 1 wherein the microporous membrane is manufactured by stretching a polymeric blend of two incompatible polymers.

8. A process of manufacturing a construction board as specified in claim 1 wherein the microporous membrane is manufactured by stretching a polymeric film that is filled with inorganic particles.

9. A process of manufacturing a construction board as specified in claim 8 wherein the microporous membrane is biaxially oriented.

10. A process of manufacturing a construction board as specified in claim 8 wherein the microporous membrane is comprised of a nylon.

11. A process of manufacturing a construction board which comprises (1) manufacturing a breathable film by stretching a polymeric blend of two incompatible polymers, (2) positioning a wet gypsum composition between a first facer and a second facer to make a laminated sheet of wet construction board, wherein the first facer is comprised of the breathable film and a glass-mat, wherein the breathable film and the glass mat are bonded together with an adhesive, wherein the breathable film is comprised of a breathable polymeric material selected from the group consisting of polyolefins, nylons, polyesters, and thermoplastic elastomers, wherein the breathable film has a thickness which is within the range of 0.5 mils to 5 mils, wherein the breathable film is a microporous membrane, and wherein the polymeric material is water resistant, and (3) heating the laminated sheet of wet construction board to an elevated temperature for a period of time which is sufficient to reduce the moisture content of the gypsum to be within the range of 18 to 25 percent.

12. A process of manufacturing a construction board which comprises (1) manufacturing a breathable film by stretching a polyolefin film, a polyester film or a nylon film that is filled with inorganic particles, (2) positioning a wet gypsum composition between a first facer and a second facer to make a laminated sheet of wet construction board, wherein the first facer is comprised of the breathable film and a glass-mat, wherein the breathable film and the glass mat are bonded together with an adhesive, wherein the breathable film is comprised of a breathable polymeric material selected from the group consisting of polyolefins, nylons, polyesters, and thermoplastic elastomers, wherein the breathable film has a thickness which is within the range of 0.5 mils to 5 mils, wherein the breathable film is a microporous membrane, and wherein the polymeric material is water resistant, and (3) heating the laminated sheet of wet construction board to an elevated temperature for a period of time which is sufficient to reduce the moisture content.

13. A process of manufacturing a construction board as specified in claim 11 wherein the polyolefin is polypropylene.

14. A process of manufacturing a construction board as specified in claim 13 wherein the polypropylene is filled with dispersed particles of calcium carbonate.

15. A process of manufacturing a construction board as specified in claim 11 wherein the breathable film is 0.5 mils to 5 mils thick.

16. A process of manufacturing a construction board as specified in claim 1 wherein the breathable film is 0.8 mils to 2 mils thick.

17. A process of manufacturing a construction board as specified in claim 1 wherein the wet gypsum composition consists of gypsum and water.

18. A process of manufacturing a construction board as specified in claim 12 wherein the wet gypsum composition consists of gypsum and water.

19. A process of manufacturing a construction board as specified in claim 18 wherein the breathable film is comprised of a thermoplastic elastomer.

* * * * *